United States Patent [19]
Ko

[11] Patent Number: 5,463,629
[45] Date of Patent: Oct. 31, 1995

[54] DYNAMIC CHANNEL ALLOCATION METHOD AND SYSTEM FOR INTEGRATED SERVICES DIGITAL NETWORK

[76] Inventor: Cheng-Hsu Ko, 5 Manor Pkwy., Salem, N.H. 03079

[21] Appl. No.: 976,923

[22] Filed: Nov. 18, 1992

Related U.S. Application Data

[63] Continuation-in-part of Ser. No. 914,618, Jul. 17, 1992, abandoned, which is a continuation-in-part of Ser. No. 890,588, Jul. 13, 1992, abandoned.

[51] Int. Cl.⁶ ................................................. H04J 3/12
[52] U.S. Cl. .................. 370/110.1; 370/85.6; 340/825.5
[58] Field of Search ................................ 370/110.1, 60, 370/94.1, 94.2, 4, 29, 58.1, 60.1, 85.6, 118, 84, 7; 340/825.01, 825.05, 825.2, 825.5, 825.51, 825.52; 379/88, 269, 94, 95, 96; 341/61; 348/384, 387, 388, 390

[56] References Cited

U.S. PATENT DOCUMENTS

| | | | |
|---|---|---|---|
| 4,949,338 | 8/1990 | Albal et al. | 370/85.6 |
| 4,985,887 | 1/1991 | Mizuhara et al. | 370/60 |
| 5,023,869 | 6/1991 | Grover et al. | 370/118 |
| 5,115,426 | 5/1992 | Spanke | 370/60 |
| 5,148,272 | 9/1992 | Acampora et al. | 370/110.1 |
| 5,163,083 | 11/1992 | Dowden et al. | 379/88 |
| 5,231,631 | 7/1993 | Buhrke et al. | 370/110.1 |

OTHER PUBLICATIONS

"Newton's Telecom Dictionary", Sixth Edition, p. 387.
"ISDN, An Introduction", William Stollings, pp. 23–25 and 292–304.

*Primary Examiner*—Douglas W. Olms
*Assistant Examiner*—Dang Ton
*Attorney, Agent, or Firm*—Lowe, Price, LeBlanc & Becker

[57] ABSTRACT

Dynamic channel allocation in an ISDN line is implemented above a Level II link layer protocol (LAPD). The preferred embodiment comprises programming operating on a computing platform system including a communication coprocessor system. The programming includes a channel management module (CMM) and a virtual channel module (VCM) to implement dynamic channel Allocation. The modules cooperate to control bandwidth between communication partners by selective allocation and deallocation of virtual B-Channels between them in response to preassigned priorities and real time events. Voice and data channels are interrogated. Channel deallocation also takes place in response to high error rates in message transmission.

42 Claims, 14 Drawing Sheets

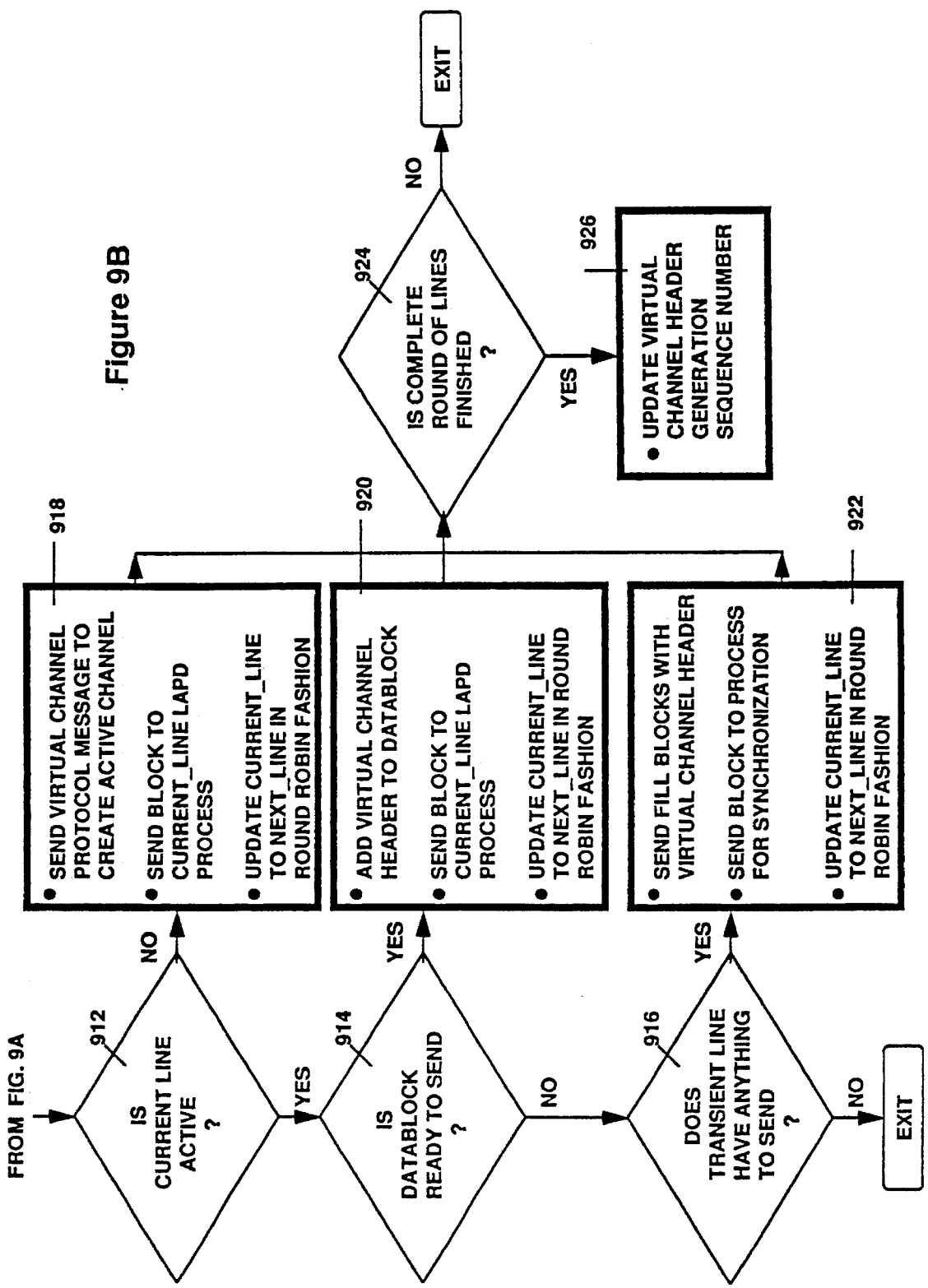

DYNAMIC CHANNEL ALLOCATION METHOD AND SYSTEM FOR INTEGRATED SERVICES DIGITAL NETWORK

CROSS REFERENCE TO RELATED APPLICATIONS

This application is a continuation-in-part of application U.S. Ser. No. 07/914,618 now abandoned, filed Jul. 17, 1992 which in turn is a continuation-in-part of U.S. Ser. No. 07/890,588, filed Jul. 13, 1992 now abandoned.

TECHNICAL FIELD

This invention relates generally to Integrated Services Digital Network (ISDN), and more particularly to controlling dynamic channel allocation in ISDN and to creating a virtual channel out of underlying network channels.

Background Art

A digital telecommunication network can be characterized by two general features, the existence of well defined digital interfaces to Customer Premise Equipment (CPE) which are the end nodes of the network, and an interconnected switching backbone network which is capable, upon demand, of creating point-to-point connections between any two end nodes. An example of such a network architecture can be found in the ISDN specifications which have been developed by the International Telegraph and Telephone Consultative Committee (CCITT). Although aspects of the invention may be relevant to other types of digital telecommunication networks, in the paragraphs below, the general features of a digital telecommunication network upon which this invention depends will be described using examples drawn from ISDN.

A complete description of the architecture of ISDN is beyond the scope of this specification. For details, and for an extensive bibliography of references of ISDN, see Stallings, ISDN, *An Introduction,* MacMillan Publishing Company, 1989. In general, all ISDN interfaces to customer premises equipment (CPE) can be characterized by the use of time division multiplexing at the physical layer to partition the bandwidth of a single physical link into multiple independent channels, such as the two B-Channels and the D-Channel (2B+D) found in the Basic Rate Interface (BRI) and 23 B-Channels and the D-Channel (23 B+D) or 30 B-Channels and the D-Channel (30 B+D) found in the Primary Rate interface. Broadband ISDN is an implementation of ISDN having more than 30 B-Channels.

In every form of ISDN, the D-Channel carries signalling or control data which provides control over the use of the two B-Channels in the BRI as well as user data which often is in the form of packets. These channels can be considered as independent ISDN resources available to the end user. ISDN also defines a specific data link layer and network layer protocol to be used over the D-Channel between the CPE and the Local Exchange (LE).

The B-Channel in an ISDN network is a full duplex, 64000 bit per second, synchronous user channel. There are many modes of operation for the B-Channel. The preferred embodiment of this invention is described in the environment of the BRI and is based in part on the capability of the B-Channel to carry digital data or PCM-encoded digital voice in a transparent manner across the circuit switched backbone network. The same principles can be extended to the Primary Rate Interface (PRI) and Broadband ISDN (BISDN). Before a circuit switched B-Channel can be used by end users, the channel must be connected through the ISDN. Requests for channel connection are made by the CPE to the LE using a protocol over the D-Channel. The LE routes the request through the ISDN using other protocols, until the destination LE is reached. The destination LE then issues a call connection request to the destination CPE which can accept the call. Either party to a call can disconnect the call. This action also involves relaying a series of messages over the respective D-Channels and other network activity. The ISDN network itself can also disconnect the call due to error conditions inside the network. Unlike analog telecommunication networks, the time to connect or disconnect a channel is anticipated to be very short, potentially on the order of a second.

An important characteristic of B-Channels in an ISDN is that the network is permitted to create independent paths inside the network for each circuit switched B-Channel. Thus if a CPE connects two B-Channels to another CPE, the CPE can not rely on the network to synchronize the transmissions across the two channels. A second important characteristic of B-Channels in an ISDN is that they can be used for multiple purposes, such as voice service or data service, and a BRI can support multiple devices such as a computer and a telephone.

When one considers using the data services of ISDN to connect computers, the bandwidth of a single B-Channel is a serious limitation. This is particularly true when one considers that many computer network applications are geared toward local area networks in which applications commonly achieve point-to-point communication speeds on the order of several hundred thousand bits per second or greater. Another disadvantage of the use of circuit switched B-Channels is the bursty nature of data traffic and the fact that the tariff structure for circuit switched channels is independent of the data traffic over the channel. This can lead to inefficient use of a channel resulting in excessive channel usage cost.

An additional limitation is the desire to share the ISDN interface with other devices, such as a telephone, without having to statically allocate a channel to each user of the interface. In the event of contention for channel between different users, high priority channel users should be able to preempt channels from low priority channel users. The present invention addresses these limitations and provides a method to overcome them.

Dynamic channel (bandwidth) allocation per se is not new to ISDN. U.S. Pat. Nos. 4,763,321 and 4,805,167 describe techniques to accomplish channel synchronization at the physical level (bit level synchronization) by manipulating the ISDN interface frame structures (time division multiplex, or TDM, frames) to create a high data rate virtual channel. However, it is disadvantageous to carry out operations at the physical level (Level 1 of open system integration architecture, or OSI) which require manipulation of hardware. The present invention does not operate at the physical level and makes no attempt to manipulate the ISDN physical interface.

DISCLOSURE OF INVENTION

Accordingly, a broad object of the invention is to improve bandwidth utilization of ISDN.

Another object is to dynamically allocate B-Channels between ISDN communication partners in response to pre-assigned priorities and real time events.

Another object of the invention is to enable computer networking on ISDN while retaining support of traditional telephone services.

An additional object is to carry out automatic ISDN channel allocation in a manner that is transparent to a user.

Still another object of the invention is to carry out improved protocol for implementing dynamic bandwidth allocation in ISDN.

A further object of the invention is to carry out the aforementioned objects without manipulation of data at the physical layer.

To achieve the above and other objects, the invention provides a computer program implementation that enables a CPE device to dynamically manage the ISDN resources available to it in such a manner as to overcome the above mentioned limitations of ISDN. The invention enables ISDN to accommodate a computer network while retaining the ability to also support traditional telephony services.

One aspect of the invention carries out dynamic channel allocation in an ISDN line by monitoring events supplied to the line which indicate requests to use or release a B-Channel, evaluating channel usage priorities associated with users generating events monitored, and, based upon channel usage priorities, automatically setting up or tearing down B-Channels associated with the line. Processing takes place, in the preferred embodiment, above LAPD protocol.

In accordance with the preferred embodiment of the invention, upon a hardware platform are provided first and second program modules, a channel management module (CMM) and a virtual channel module (VCM), to implement dynamic channel allocation. The program modules cooperate to control bandwidth between communication partners by selective allocation and deallocation of virtual B-Channels between them in response to preassigned priorities and real time events. The programming may take the form of software executed by computer, or may be in the form of firmware resident on the same board in the computer as carries the ISDN communication hardware.

The first program module, CMM, monitors requests to connect and disconnect B-Channels by potential end users and the second module (VCM). The CMM is capable of signalling the VCM to force deallocation of a from a virtual channel based on a request for channel connection by a higher priority end user. The CMM signals the VCM to indicate the existence of available B-Channels when end users disconnect the channel.

The second module, VCM, provides a block oriented transport service to various computer processes which can operate over one or more B-Channels. This service operates above the data link layer and manages the multiplexing of messages across one or more data link connections which operate on a B-Channel so as to ensure properly ordered delivery of message blocks. Channels are added or deleted on a dynamic basis, without interrupting the flow of data. The service supports the allocation and deallocation of channels based on signals from the CMM. Channel deallocation also takes place in response to high error rates in message transmission.

The program modules implemented in accordance with this invention provide control logic for a CPE device to allocate and deallocate ISDN channels to a plurality of end users, i.e., local analog telephone equipment, the various processes running on the local computer system, and similar entities located remotely on the ISDN network. Implementation is based both on user specified priorities and the real time requirements of each user. The modules also support the virtualization of B-Channel resources so as to overcome the bandwidth limitations of a single B-Channel.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIGS. 9A and 9B is a flow chart of a routine for sending to a remote resource.

DETAILED DESCRIPTION OF THE INVENTION

1. OVERVIEW

The preferred embodiment of the invention provides a computer-to-ISDN interface residing at customer premises equipment (CPE) and operating above Link Access Protocol D (LAPD) protocol to perform dynamic channel allocation and deallocation in response to processes occurring on the ISDN and in accordance with user priorities. In the preferred embodiment, the CPE comprises an ISDN board which contains an ISDN interface, either at the ISDN T reference point or at the U reference point, and the RJ-11 interface. The interface is implemented by programming executed by a processor that, in one example of the preferred embodiment, is mounted on at least one commercially available ISDN communications cards. In a second example, the programming is in the form of software executed by the resident computer which may, for example, comprise a personal computer that is IBM compatible.

2. SYSTEM REQUIREMENTS

Figure 1A:
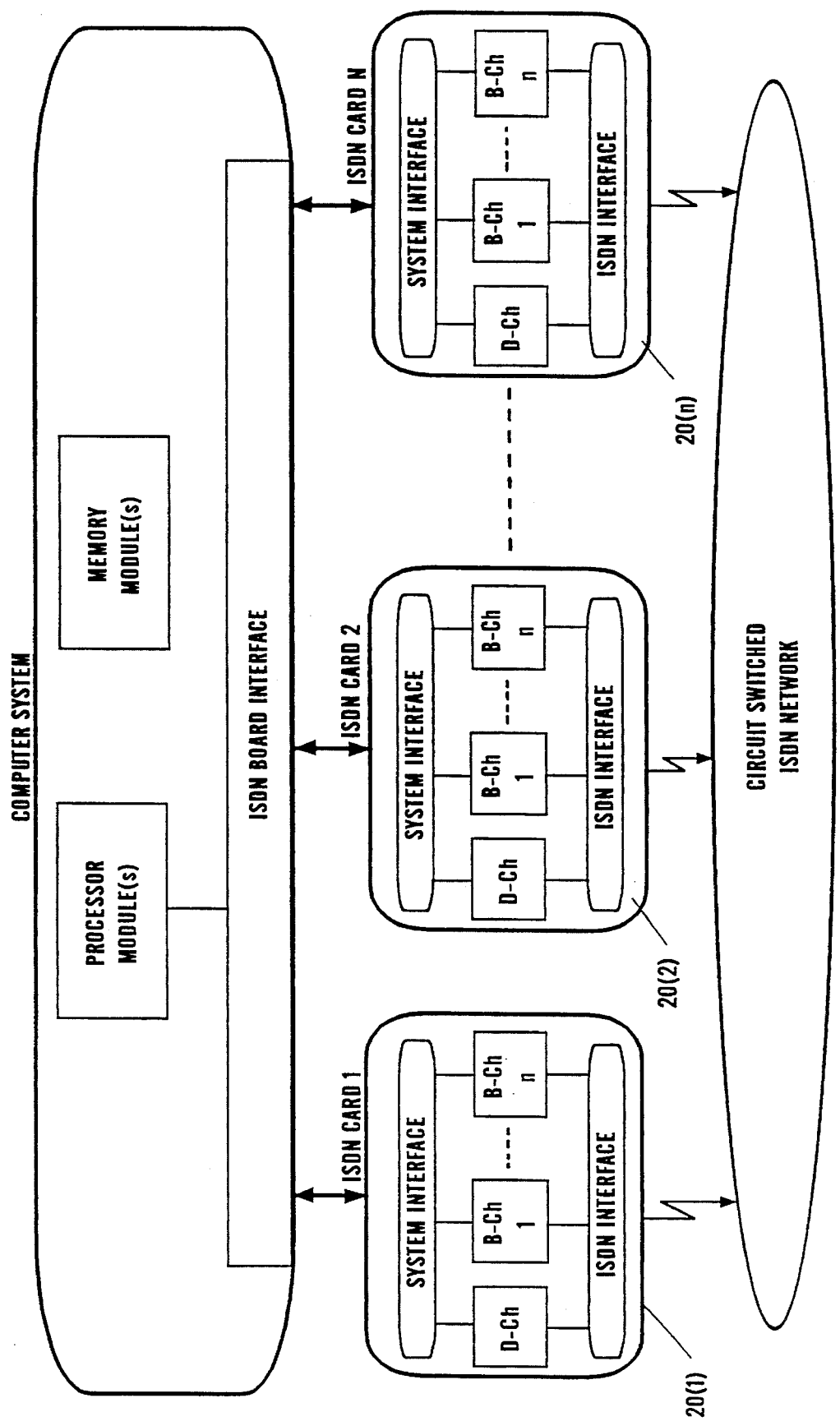
FIG. 1A is a generalized circuit diagram of the hardware platform upon which programming in accordance with the invention is implemented.

In general, as shown in FIG. 1A, the system within which the invention is practiced is comprised of a computer system capable of supporting one or more ISDN cards 20(n) with BRI, PRI or Broadband interfaces. The ISDN cards 20(n) provide a generic system interface to a computer system, and form, in essence, an input/output (I/O) subsystem that affords message passing and signalling to permit various processes on the ISDN to communicate with each other. Furthermore, the ISDN cards 20(n) provide full capability of B-Channels and D-Channel message processing. The subsystem furthermore includes a software module which implements the user side of the ISDN D-Channel signalling protocol. This includes the data link layer, or LAPD, as specified in ISDN specification Q.921, and the network layer as specified in Q.931. The I/O subsystem supports an analog telephone, manages the conversion of analog-to-digital signals according to the ISDN standard, and interfaces to the computer system to support connection and disconnection of a voice call.

Finally, the I/O subsystem provides a data link layer protocol which can support a separate data link connection over each of the B-Channels. The data link process will have an implementation which supports full duplex operation by separate transmit and receive queues and interrupt driven thread dispatching based on the event of a message arriving to the system or a message being queued for transmission. Hence, the transmit and receive threads are non-blocking from a dispatch point of view.

3. PLATFORM HARDWARE

A generic hardware platform in the form of any commercially available ISDN card having the following characteristics can be used for implementing the present invention:

1. Platform ability to off-load frame processing requirements from the computer system allowing more CPU cycles for routing decisions and upper layer processing;
2. Two high speed serial I/O controllers (SIOC);
3. Optional support of RJ11 jack Touch-Tone (TM) telephone sets for voice;
4. Support of RJ45 jack for connection to ISDN;
5. DMA host interface with buffer fragmentation and multiple frame features;
6. On-card CRC generation;
7. On-card abort detection and frame status; and
8. Host interrupt on the conditions of (a) after receiving n input frames, (b) after transmitting n output frames, and (c) upon any abnormal conditions, selectable by bit mask.

Figure 1B:
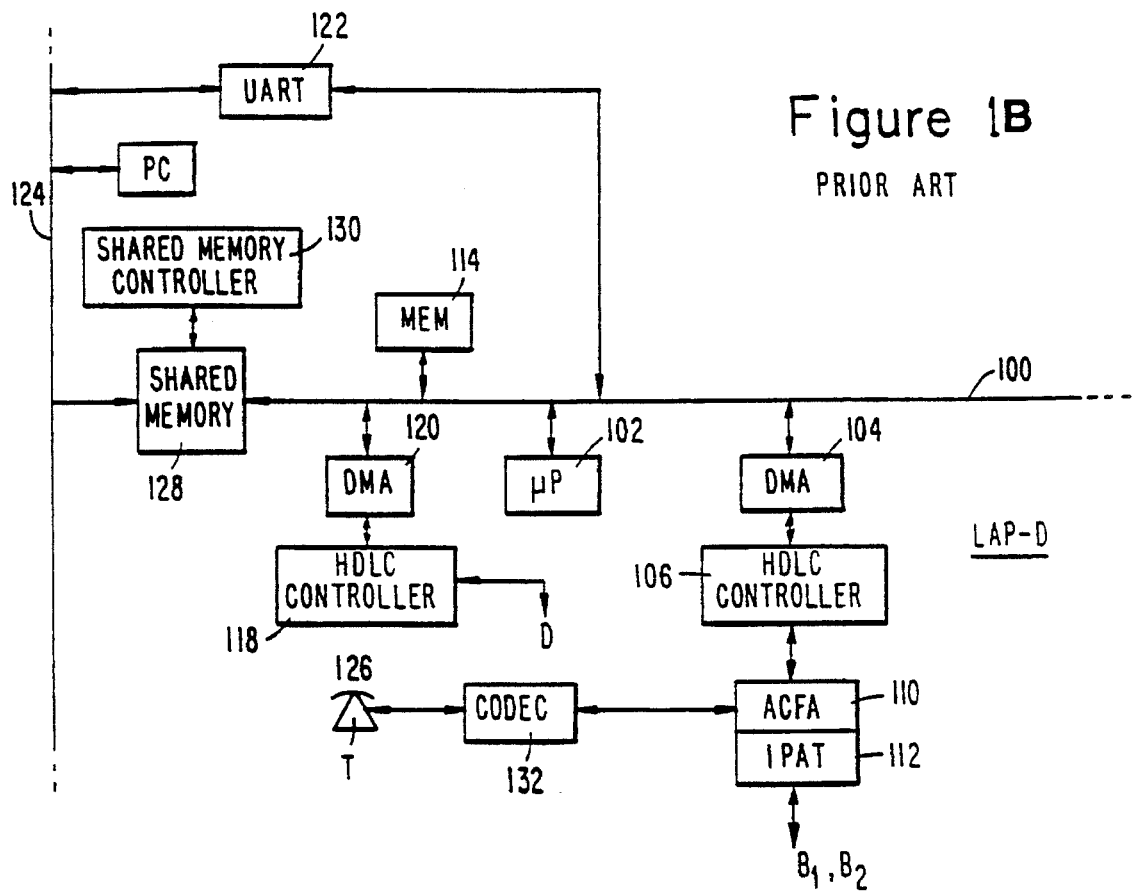
FIG. 1B is a specific example of a hardware platform of FIG. 1A within which the invention may be implemented.

For example, the hardware platform in the preferred embodiment, shown in FIG. 1B, is implemented by the commercially available Teleos B101 ISDN Communication Coprocessor System board. Implementation of the user side of the ISDN D-Channel signalling protocol is carried out by Signalling Interface Process (SIP) software found in typical ISDN cards and accompanying the Teleos B101. Mapping a Hayes AT command set to ISDN commands to connect and disconnect B-Channels is implemented by the Teleos AT/PAD process. Further details of the Teleos B101 communication coprocessor are given in the B101 PC Hardware Reference Manual (REV A), 1990, available through Teleos Communications, Incorporated.

Figure 7:
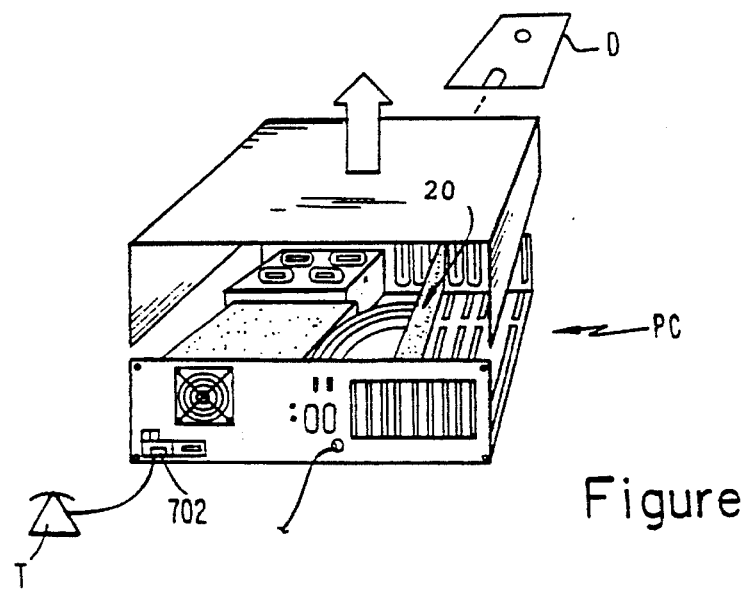
FIG. 7 is a representative view of an ISDN circuit card mounted in a computer and carrying the hardware shown schematically in FIG. 1.

The present invention is implemented at customer premise equipment, preferably by incorporation on at least one printed circuit board or card 20 as shown in FIG. 7, adapted to be mounted in an available slot of a personal computer PC. Although an IBM compatible computer is used in the preferred embodiment, other forms of computer can be adopted. A conventional analog telephone T is connected to the card 20 at RJ-11 plug 702. Programming used in this invention may be in the form of firmware mounted on the ISDN card or cards 20, or may be recorded on a disk D loaded into the disk drive of the computer.

The hardware platform upon which the invention is implemented in the preferred embodiment, as depicted schematically in FIG. 1B, includes an internal bus 100 supporting a microprocessor 102, preferably a 68000 type, such as a 68HC00CP12. A direct memory access (DMA) controller 104, such as an NEC uPD 71071 Controller, on the bus handles memory to memory and serial I/O to memory transfers. An HDLC controller 106, such as an NEC uPD 72001, is connected to the RAM 114. The DMA and HDLC controllers 104, 106 together operate at HDLC framing protocol, carrying out conversion of data in parallel bit format to serial bit format for supply to ACFA 110 and IPAT 112. The ACFA 110 and IPAT 112, which are commercially available ISDN chips, provide physical interfacing with the ISDN, performing framing, electrical signal conversion, and D-Channel collision detection functions. Using the RJ-11 plug shown in FIG. 7 at the rear of the coprocessor board, the ACFA 110 is interfaced to an analog telephone 126 through a CODEC 132.

The HDLC 106 controller has four channels, with one line incoming and another outgoing for each channel for full duplex operation. Logic implemented in the HDLC controller 106 identifies start and stop bits of each incoming block.

Upon receipt of a block as determined by the start and stop bit framing patterns, and following error detection using a checksum protocol indicating the block contains no errors, the HDLC controller 106 instructs the DMA controller 104 to pass the block to a selected location in a random access memory (RAM) 114 on the bus. If there is an error in the block, an error routine is executed.

Upon transmission of data, start and stop flags are applied to define a block, bit stuffing is carried out as necessary, and the block is discharged on the two B-Channels comprising the BRI. Another HDLC controller 118, operating with a DMA controller 120, carries out similar functions for the D-Channel of the ISDN line. Communication between the DMA controller 120 and the RAM 114 in the preferred embodiment is implemented using the SIP protocol of the Teleos B101 ISDN communication coprocessor board.

Also residing on bus 100 is a UART 122 forming a COM port that interfaces data bi-directionally, one block at a time, between bus 100 and a bus 124 that preferably is an ISA (AT compatible) bus, upon which resides the user's personal computer (or general computer).

Another interface to user bus 124 is a memory 128 that is shared by both busses 100 and 124. The shared memory 128 is controlled by a shared memory controller 130 divided into two blocks, one for control information and the other for utilities such as debugging. The shared memory 128 receives data at separate read/write ports in a known manner to provide service to both of the busses 100 and 124.

Each program module, described below, supports message passing interfaces to and from other processes in the system and is an event driven, dispatchable thread being run under the real time kernel.

4. PLATFORM SOFTWARE

Figure 2A:
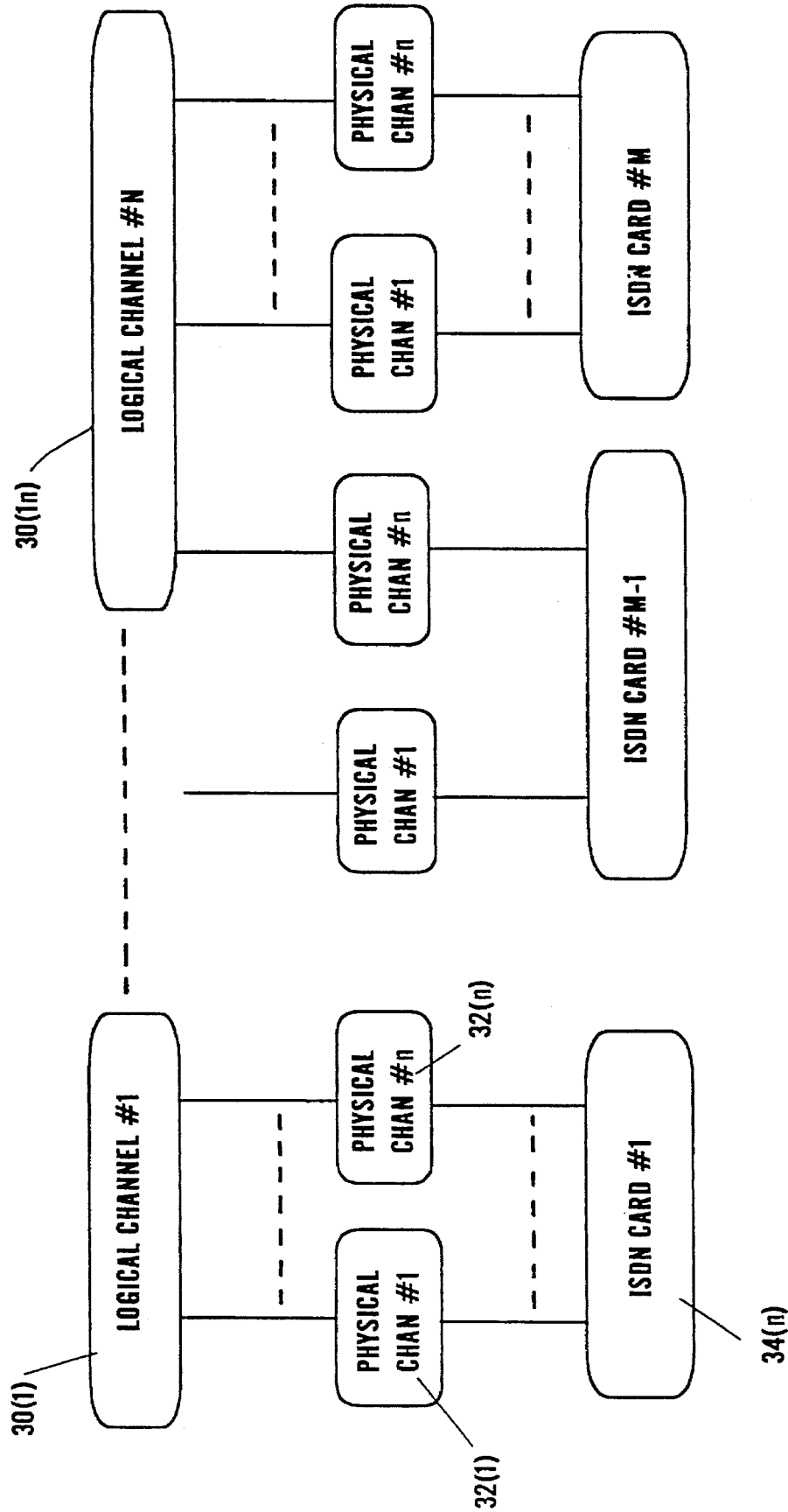
FIG. 2A is a hierarchical channel control system software module diagram of a generic computer system known in the prior art and forming a part of the hardware platform shown in FIG. 1 for implementation of the invention.

FIG. 2A, depicting the software architecture for implementing the computing platform applies to the generic hardware platform of FIG. 1A and the Teleos-specific platform of FIG. 1B, supports the principal program modules and their interfaces resident in the system. To facilitate the dynamic bandwidth mechanism, a hierarchical channel control system is established with logical channels 30(n) at the highest layer. A logical channel as shown is made up of one or more physical channels whose aggregate bandwidth can be greater than that of a single B-Channel.

The next layer consists of physical layers 32(n), one physical channel for each V.120 (B-Channel) controlled by the software control module. Below the physical channels exists the ISDN card layer 34(m) containing information organized on an ISDN card level.

Three mechanisms are specified for dynamic altering of bandwidth assignment. First, if a logical channel is not assigned to the destination network address of data in the form of a data packet which is to be transmitted, a new logical channel is allocated, and a physical channel and ISDN phone number are attached (the ISDN card is implicitly attached since the physical channel is tied to a specific ISDN card). Second, if an SIP disconnect is either initiated or received for a B-Channel, the physical channel associated with the bandwidth is released. And third, for logical channels which initiate communications, bandwidth can be increased or decreased based on the utilization level of the logical channels.

For each logical channel, there exist high and low water marks that specify data throughput thresholds and action times for bandwidth adjustment procedures. To measure line utilization, throughput statistics are calculated once per second. If the throughput consistently exceeds the established water mark for the high water mark action time, an additional B-Channel will be assigned. If the throughput consistently does not meet the established low water mark for the low water mark action time, and multiple physical channels are currently attached to the logical channel, a B-Channel will be removed from the logical channel.

Figure 2B:
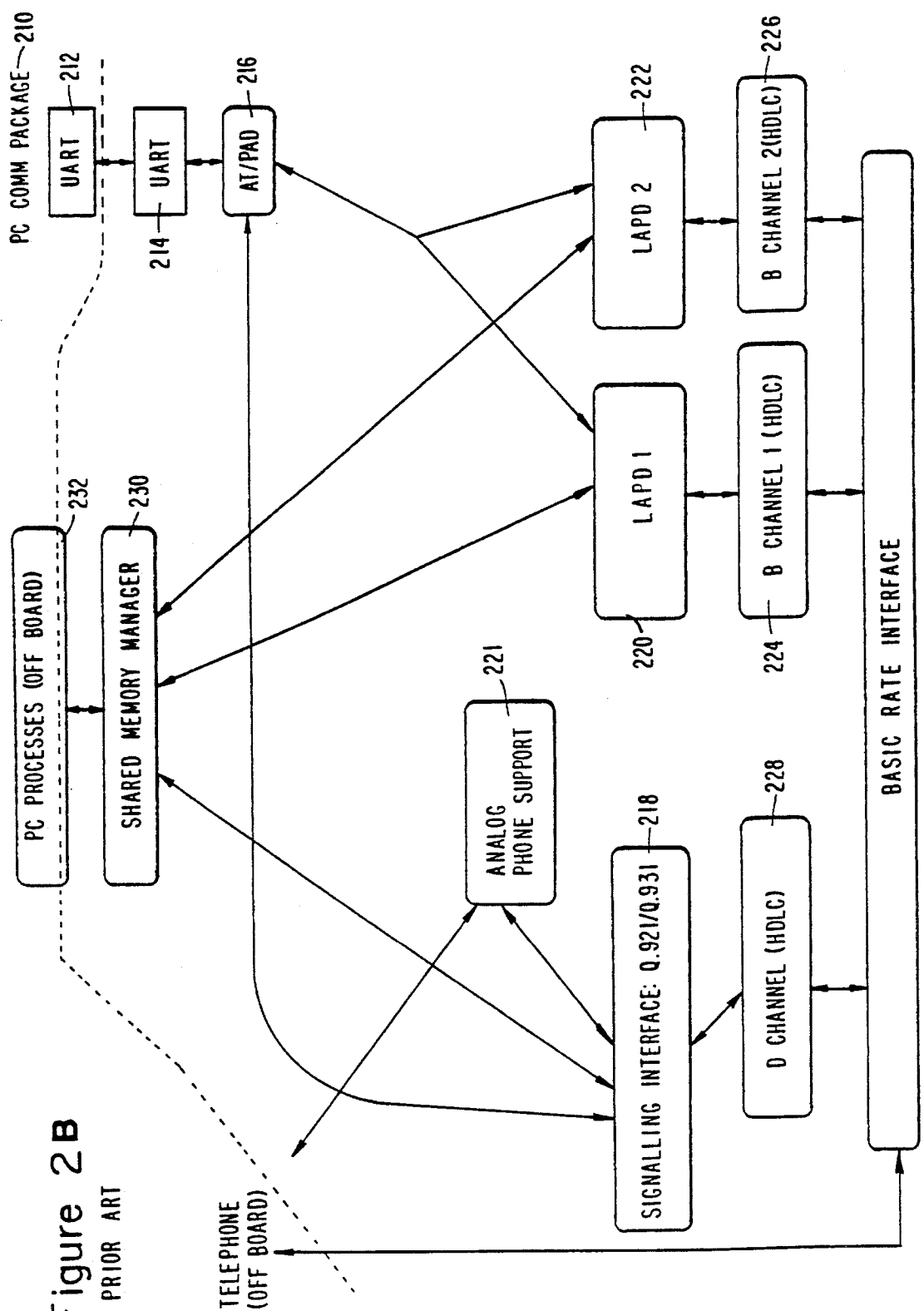
FIG. 2B is a diagram of a specific prior art communication coprocessor system upon which the functions shown in prior art FIG. 2A may be carried out.

In the embodiment of FIG. 2B, using the architecture of the Teleos B101 ISDN card, an off-card PC Comm Package 210 together with UART 212 on the user bus 124 is coupled to the communication coprocessor circuit at card resident UART 214. User side ISDN D-Channel signalling protocol is carried out at the data link layer (LAPD) and at the network layer by software module 218. In the Teleos B101 coprocessor board, module 218 is implemented by SIP protocol.

AT/PAD 216 interfaces with one of the two B-Channels forming the BRI by accessing either the LAPD 1 or LAPD 2, module 220 or 222 with corresponding HDLC modules 224 or 226. These modules enable a separate data link connection over each of the B-Channels in the system. The data link process implements full duplex operation using separate transmit and receive queues and interrupt driven thread dispatching based on the event of a message arriving to the system or a message being queued from transmission.

These processes are implemented in the Teleos coprocessor board as the V.120*/LAPD1 and V.120**/LAPD2 processes.

Shared memory manager module 230 directs flow of data between the shared memory 232 and the three BRI channels through interface 218 and HDLC 228 (D-Channel) and LAPD, HDLC modules 220–226 (B1- and B2-Channels).

The architecture further supports an analog telephone, managing conversion of analog to digital signals according to the ISDN standard including D-Channel signalling (SIP) protocol.

5. DYNAMIC CHANNEL ALLOCATION

Figure 3A:
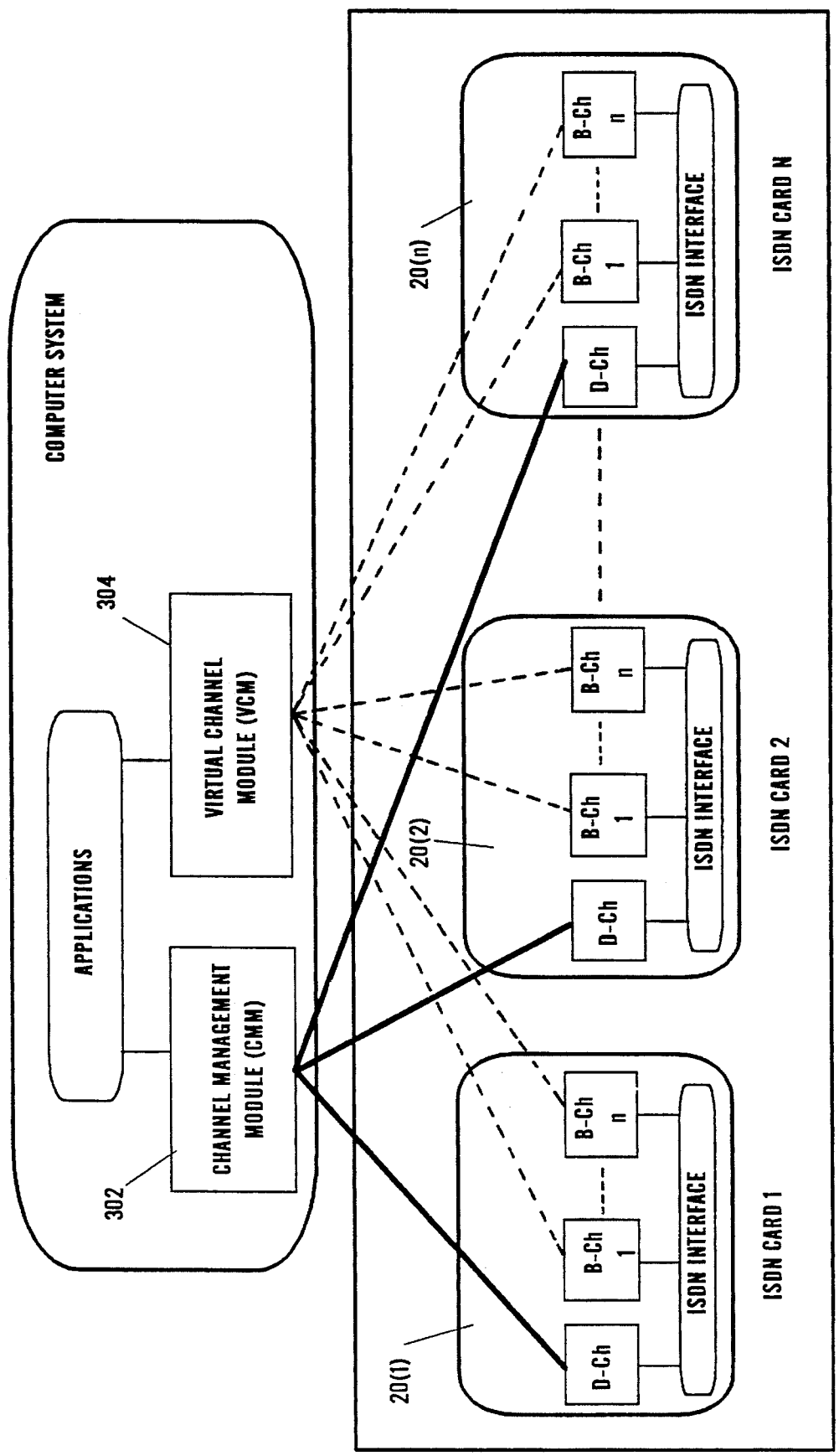
FIG. 3A is a software module diagram corresponding to FIG. 1, including additional software modules executed off-card, and comprising an aspect of the invention.
Figure 3B:
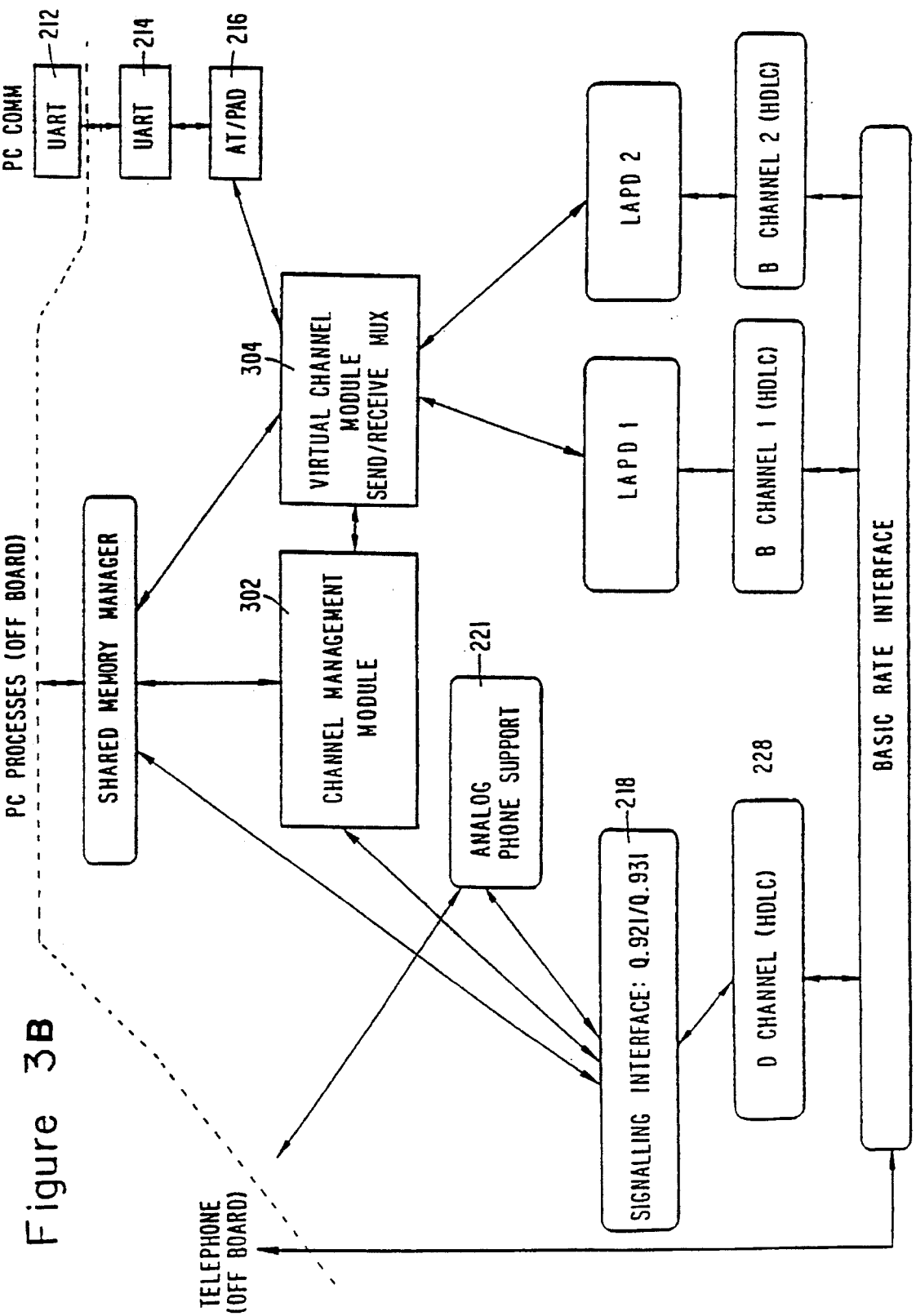
FIG. 3B is a more detailed software diagram corresponding to FIG. 1 wherein the additional software modules are executed on-card.

Referring to FIG. 3A, the preferred embodiment of the invention is provided as two new program modules 302 and 304 to establish channel allocation management and virtual channels of greater bandwidth than a single B-Channel. For convenience, the description of these modules is first provided with respect to any number of generic ISDN cards 20 (n), as shown in FIG. 3A, then the Teleos B101 ISDN Communication Coprocessor System as depicted in FIG. 3B wherein the new program modules are resident on a single ISDN card supporting the Teleos B101. It should be understood, however, that the concepts taught herein can be applied to any other system supporting these new program modules.

The generalized system shown in FIG. 3A, with programming resident off-card, is capable of accommodating any number of ISDN cards operating in parallel, and hence, subject to the number of cards involved, is capable of accommodating any bandwidth. For example, if the system incorporates a single ISDN card 20 having two physical B-Channels (n=2 in FIG. 2A), the system of FIG. 3A will accommodate BRIISDN. On the other hand, if the system incorporates an ISDN card 20 having 24 physical B-Channels (n=24 in FIG. 2) or a number of such cards having an aggregate of 24 channels, the system will accommodate PRIISDN (the number of physical B-Channels defined by PRI is 31 in some countries outside the United States, and hence, the number of physical channels included with ISDN cards 20 will correspond to the larger number in those countries). In the case of Broadband ISDN (BISDN), the number of physical channels accommodated by card or cards 20 (n) is greater than 31.

Figure 5A:
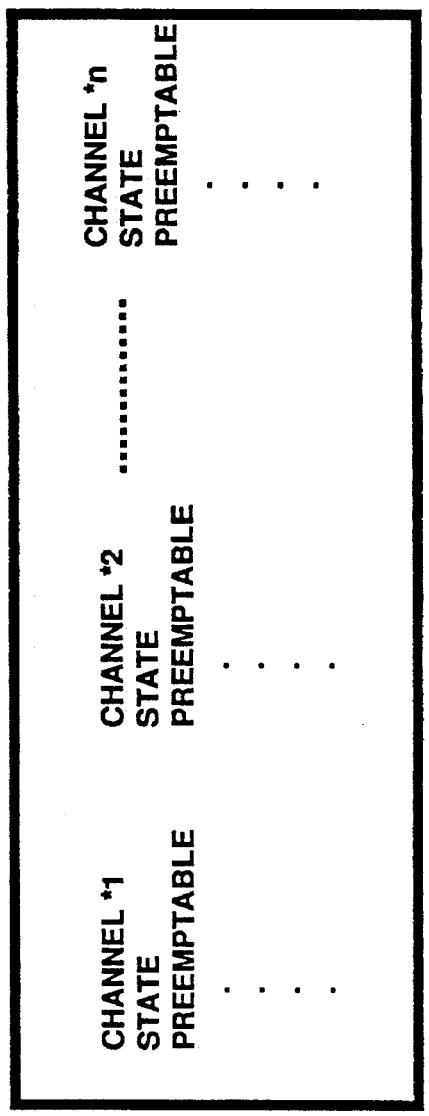
FIGS. 5A and 5B are diagrams of B-Channel state tables and priority levels maintained by the CMM.

Referring to FIGS. 3A and 3B, module 302, the channel management module (CMM), monitors B-Channel usage and preempts the use of a B-Channel by a lower priority user when the channel is needed by a higher priority user. To accomplish this function, CMM 302 maintains a state table 502, shown symbolically in FIG. 5A, which indicates the state of each B-Channel including whether the channel is a "preemptable channel," that is, whether the channel is connected or disconnected and if connected, whether it is being used by a process that could release the channel in the event of preemption by a higher priority device. This process is carried out in the invention by Virtual Channel Process, described in more detail hereinafter, when more than one channel as part of a virtual channel is requested. The state table also records if a channel is in use as a result of preemption.

Figure 4:
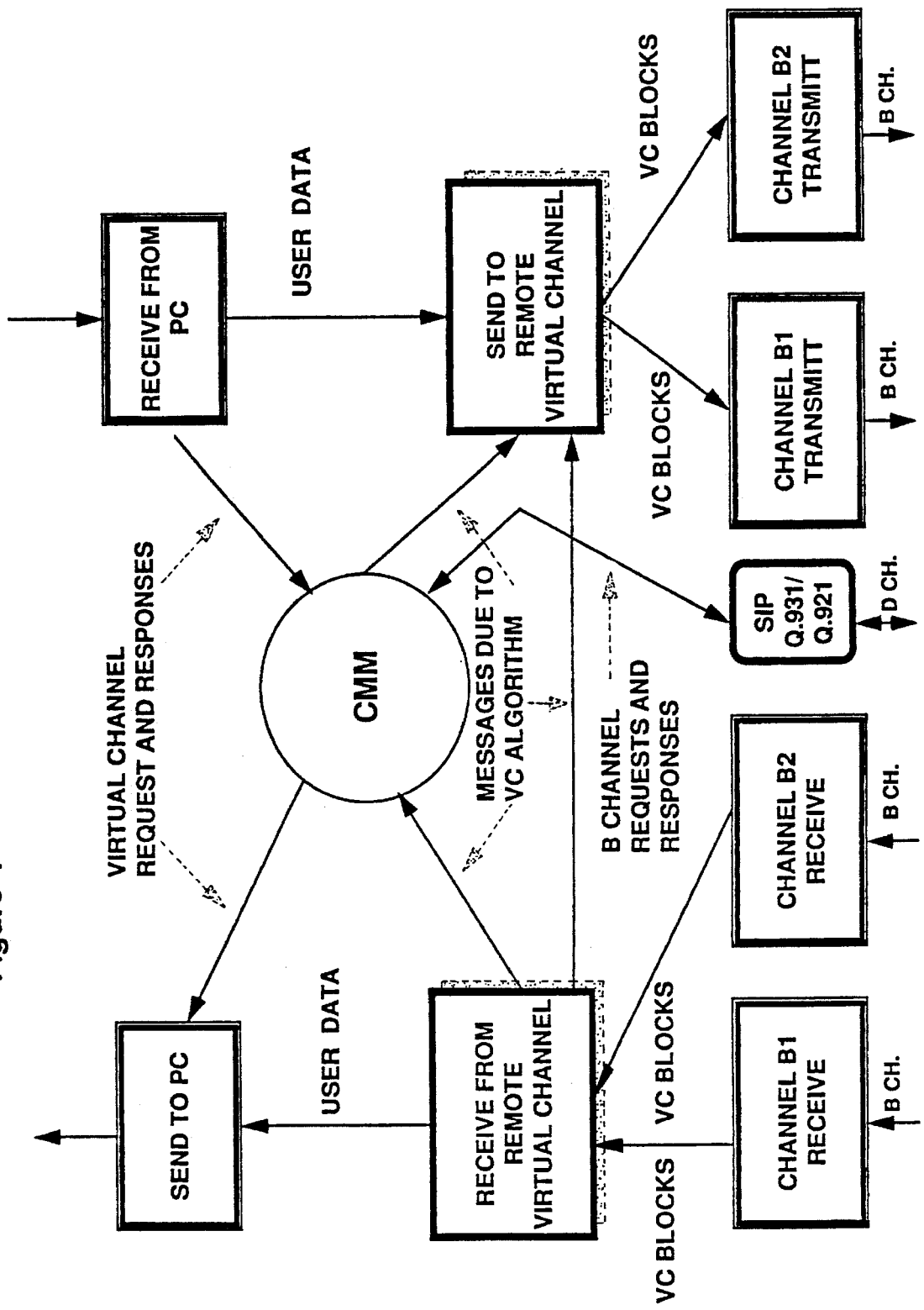
FIG. 4 is a message interface diagram for the additional modules shown in FIGS. 3A and 3B.

As shown in FIGS. 3A, 3B and 4, information necessary to maintain the table comes from messages sent by the signalling interface module 218 (SIP processes in the Teleos communication coprocessor) to the CMM; messages are sent each time module 218 receives a request for channel connection or disconnection. Local requests originate from a user process running on the computer via shared memory interrupt manager 230, the Virtual Channel Process via internal message passing, AT/PAD processes via UART 214, or the Teleos voice process via Analog Phone Support 221. Remote requests arrive over the D-Channel. Upon receipt of such a message, the CMM 302 updates the state table 502 to record the new state of a B-Channel.

Figure 5B:
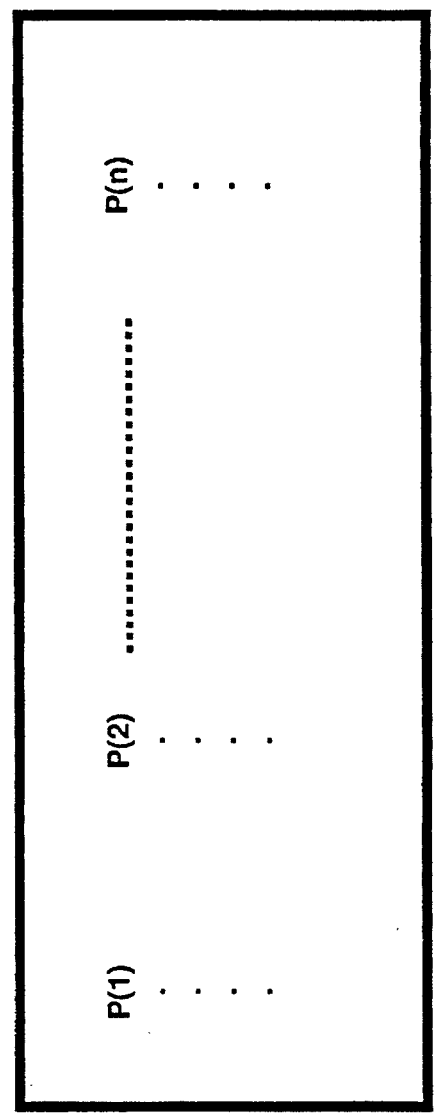

The CMM 302 also includes a table 504, shown symbolically in FIG. 5B, which maintains priority levels P(n) for all the end users n in the system. In the event that the CMM detects contention for a B-Channel, i.e., there is a request to connect a new channel but all the channels are in use, the following additional action takes place.

Figure 6:
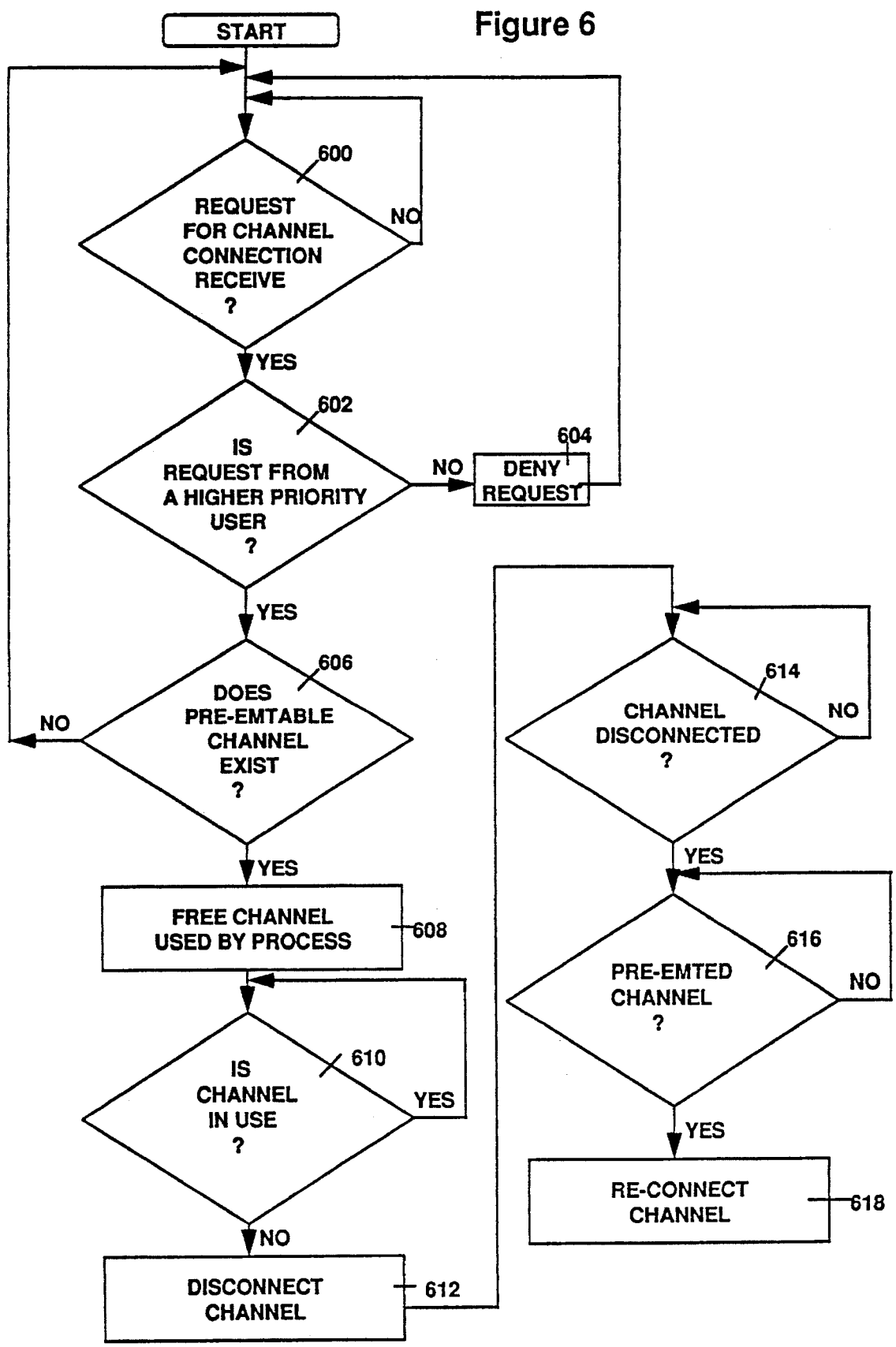
FIG. 6 is a flow chart of programming for carrying out an aspect of the invention.

Referring to the flowchart of FIG. 6, and the message interface diagram of FIG. 4, the CMM 302 first determines if a request for channel connection is received (step 600). When a request arrives, the module 302 determines whether the request is from an end user with greater priority than the users that are currently occupying the channels (step 602). If the request is from a user of equal or lower priority, the CMM takes no action and tells the signalling interface process 218 to deny the request (step 604). In the event that the request is from a higher priority user, the CMM 302 determines if a preemptable channel exists (step 606). If such a channel exists, the CMM will signal the Virtual Channel Process using the channel to logically free the channel from use (step 608), and when CMM 302 receives a signal indicating that the channel is no longer in use, step 610, the CMM will send a message to the signalling interface which will 21 cause the channel to be disconnected (step 612). In this manner a channel will be made available to the higher priority end user. An example of this occurs when the Virtual Channel Process is using both B-Channels and the end user requesting a new channel is the analog telephone.

In the event that the CMM 302 receives a message indicating that a channel has been disconnected, in step 614, the CMM determines if the channel was a preempted channel (step 616). In this case the CMM will signal the process which had the channel preempted to reconnect the channel (step 618).

The Virtual Channel Module (VCM) 304 provides the capability to dynamically combine multiple, circuit switched B-Channels into a single virtual channel which is capable of carrying a properly ordered sequence of data blocks. The VCM 304 comprises a block multiplexer/demultiplexer with buffering support to overcome the lack of synchronization across B-Channels inherent in the ISDN network. As shown in FIG. 3, VCM 304 operates in conjunction with the CMM 302 to allocate and deallocate B-Channels based on events monitored by the CMM 302. The VCM 304 has a block oriented interface to the computer processes which use block send and block receive commands via the shared memory interface 128 of the communication coprocessor circuit shown in FIG. 1. The PC computer process views the virtual channel as an ordered stream of blocks and has no knowledge of on which B-Channel the block is actually sent or received. The only indication to the computer process that the virtual channel is in use is the speed (bandwidth) available for transmission; as more channels are added or deleted, the bandwidth increases or decreases correspondingly.

The VCM 304 implements a protocol which operates as an upper sublayer of the data link layer, similar in purpose to but different in implementation from, the International Standards Organization (ISO) Multiple Link Procedure. This aspect of the invention is significant, as no processing at the physical layer, together with disadvantages associated therewith, takes place.

6. VIRTUAL CHANNEL PROTOCOL

6.1 Transitions

Component channels allocated for a virtual B-Channel have three defined states, viz., activated, deactivated, and transient states. In the deactivated state, data transfer is forbidden although control protocol exchange is not. Component channels that have been allocated but not joined to the virtual channel are initially in the deactivated state. A channel is deactivated for a sender immediately after the deactive b command, described later, has been queued for transmission. For a receiver, a channel is deactivated immediately after the command is received. Only a bi-directionally deactivated channel can be removed and physically disconnected from the virtual channel of which it was a member.

In the activated state, both data and control protocol transfer are permitted. A channel is activated to a sender only after acknowledgement of the active b command has been received. For a receiver, a channel is activated immediately following receipt of the active b command.

The transient state is defined by guarding periods before acknowledgements are received from the far-end. No user data can be sent over a channel in the transient state.

A virtual channel can be in either of two states, transient and steady. A virtual channel is transient when any component channels are transient. If no component channel is in the transient state, the Virtual Channel is in the steady state.

6.2 Virtual Channel Multiplexing

In a virtual channel, data received for transmission is sequentially distributed, one packet at a time, in a round-robin fashion over the channels in active state. The remote virtual channel process receives and recovers data in the same round-robin sequence.

To add and delete channels, protocol messages are exchanged by the sender and receiver which cause the virtual channel to enter the transient state. An active b command is sent to add a channel; a deactive b command is sent to delete one. When a virtual channel is in the transient state, the round-robin send and receive mechanism continues but the additional features are added. On the receive side, a trace-back timer is used to ensure that no conditions on a transient line will block the virtual channel for a long period of time. On the transmit side, if no user data is available, SYNC vB protocol messages optionally are sent on active lines to ensure that the receiver can initiate the trace-back timer whenever necessary. To avoid blocking of transmission of VC protocol over transient lines, SYNC vB may find it necessary to send on these steady lines, when no data block is available.

The trace-back timer, which is implemented by programming within the program module VCM, is based upon an algorithm that assumes that a transmission sent ultimately will be received by the receiving partner if any transmission sent later has been received. It is started at the probable logical end of receiving for recovery of time-inverted propagation of physical events. In the preferred embodiment, the trace-back timer is initiated upon reception of any logically younger block, whenever not all of the older blocks have arrived yet. If the communication partner does not respond within a predetermined amount of time, determined by the timer, the transmission is deemed to be invalid; or, the channels are inactive, newly connected channels, over which no transmissions have yet been sent by the far-end partner. The operation of the trace-back timer within the present system, depicted in the flow chart of FIG. 10, is described in detail later.

Rather than global sequence numbers, a packet generation number preferably is used and has meaning only in terms of round-robin line scanning. Thus if two channels are in use, the first two packets will be sent with a generation number of 1, the second two packets with a generation number of 2, etc. The sending and receiving processes both keep track of generation numbers and both use the same round-robin ordering so as to provide correct sequencing of packets.

6.3 Protocol Fields and Commands

The protocol commands, together with detailed format and bit definitions used for controlling and multiplexing over the virtual channel, are as follows.

* DATA
    Ossnnnnn: one byte as header of client's data for transmit.
* RQST Bs
    101nnnnn: one byte header of one or multiple control bytes. The first control byte can further specify explicitly whether the data is global. If the header does not specify, whether the data is global depends on the address bytes which follow. No address byte for in-band operation is required, and multiple address bytes imply that the in-band line is not explicitly included. The explicit global commands have the leftmost bit on, followed by explicitly specified address bytes. If the left-most two bits are both on, the data is a broadcast and no address bytes follow. Multiple bytes are useful for off-band control. Preferably, only one byte of in-band control is employed. The leftmost third bit is reserved, and the fourth bit is for system control point specification. These are external or internal indicated by E and I respectively as follows. The last four bits define the commands of this category. At present, these are:
    DEACTIV Bs group: uwxlz, w bit is reserved and u defines two system points.
    DEL Bs (OXOO!O), an external delete command
    DEX Bs (DEL Bs!1), a DEL Bs, followed by external setup
    DIL Bs (DEL Bs!0X10), internally initiated delete command
    DIX Bs (DEX Bs!0X10), DIL Bs, followed by internal setup
    ACTIV Bs group: uwxOz, w bit is reserved, u the same as defined above.
    ADD Bs (0X00!2), an external add command.
    AID Bs (ADD Bs!0X10), an internally initiated ADD Bs
* SYNC vB
    110nnnnn: one byte header, followed by no or multiple optional bytes. This is an acceptance acknowledgment in reply to a RQST Bs, and in-band is implied if no other bytes follow. Similar to the case in RQST Bs, the first byte which follows can further specify whether it is global. The left-most two bits have exactly the same meanings, which describe the scope of the possible additional address bytes. The left-most third bit, if on, turns the whole meaning of the response into a negative acknowledgement. The last five bits are the same as for RQST Bs.
* MODE vB
    1000000m: for virtual channel operation and format specification. This has two members, MODE rst with m=0 and MODE lbc with m= 1; MODE rst defines the nnnnn five bit generation number. The mode negotiation can proceed only when all component channels are in deactivated states, or UNA will be received. If the optional attributes are not accepted, UNA will also be received. A REJ will be received if the remote end does not support or will not accept this request. In addition to this role of mode negotiations, MODE vB resets the generation number or the global sequence number for transmitter and the corresponding variable back to 0 to restart and resets the transmitter and receiver (loop) pointers back to the first component position.
* RR
    10000010: Informs the far-end receiver that this end is ready.
* RNR
    10000011: Informs the far-end receiver that this end is not ready.
* ATTRB vB
    100000100: The parameters in APPENDIX I follow this for far-end negotiation.
* UA
    10010000: This unnumbered positive response means acceptance in the mode negotiation. The same MODE vB packet will be sent back as bi-directional initialization, following the UA. The UA is also used for acknowledgement to flow control commands RR and RNR. It is used for acceptance acknowledgement to ATTRB vB as well as unnumbered commands.
* UNA
    10010100: a negative response for refusing, used similarly to UA.
* REJ
    10011100: as explained in the MODE vB description.

All those unnumbered are in-band, although MODE vB is for global. The "nnnnn" is a module correlation generation number assigned to each round of transmissions. The "ss" in the DATA command, which has four values 11, 10, 01 and 11, is for frame segmentation.

6.4 Protocol Processing

Programming described with reference to FIGS. 9A, B and 10A, B is provided for the two key routines in the Virtual Channel, Send-To-Remote and Receive-From Remote. Both routines are initiated when a message is received from another process in the system, as shown in FIG. 4.

Process: Send_To_Remote Entry Condition

This task executes when either a message arrives from another process requesting that a block of data be sent on the virtual channel (VC), or when the process itself must transmit messages due to virtual channel protocol processing, shown in FIG. 4.

Data Structures Assumed

1. Circular List of Transmission Lines maintained in the round-robin order of transmission.

2. Current Line Ptr.

3. VC Header Block with current generation number.

Figure 9A:
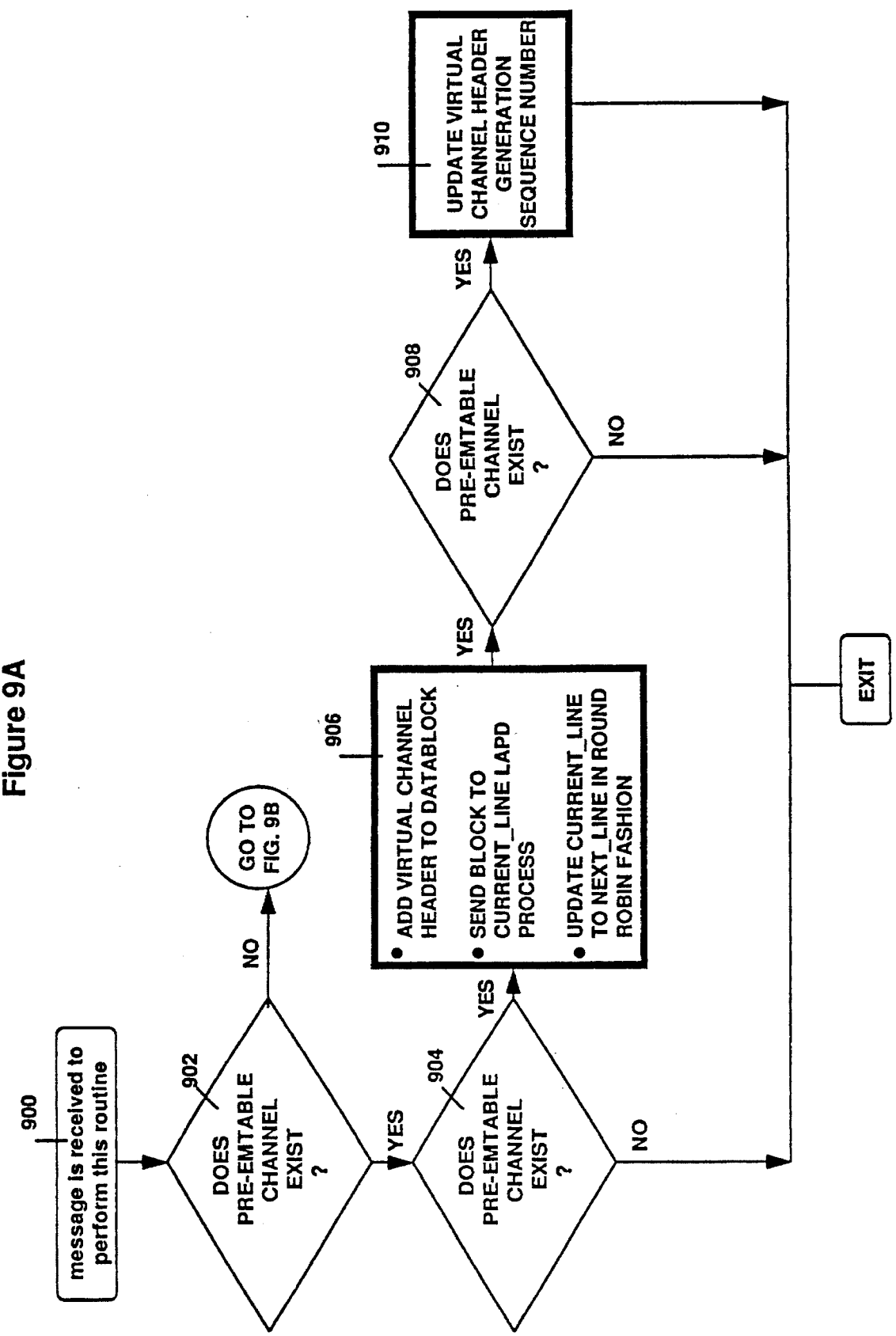

FIGS. 9A and 9B is a flow chart describing the Send_to Remote routine in accordance with an aspect of this invention. Assume initially that a message is received to activate a de-activated channel in a virtual channel, represented by step 900. A decision is made on whether the virtual channel currently is in a steady state i.e., none of its members is in transient state (step 902). Assuming that the channel is in steady state, step 904 queries whether a data block is ready to send, i.e., a block of data has been assembled. Only when a data block is ready, step 906 adds a virtual channel header to the data block, sends the block to a current line LAPD process, and then updates the current line to the next line in round-robin fashion. When a complete round of lines has been completed (step 908), the current generation number of the virtual channel header is updated in step 910.

If step 902 determines that the virtual channel is not in a steady state condition, step 912 of the program determines whether the current line is active. If the current line is not active and activation is requested, step 918 sends a virtual channel protocol message to turn it into an active channel. If the current line is active, step 914 determines whether a data block is ready for sending. When a data block is ready, steps 920, 924 and 926 carry out block assembly by adding a virtual channel header to the block to be sent, then sending the block to the current line LAPD process, updating the line in round-robin fashion and finally updating the virtual channel header generation sequence number as in steps 906–910.

When step 914 determines that a data block is not ready to send, step 916 queries whether the transient line has any protocol to send. If there is nothing to send, it exits. If protocol is available for sending in the transient line, step 922 prepares the current line for transmission by carrying out a synchronization protocol, i.e., sending full-blocks with the virtual channel header, and then updates the current line to the next line in round-robin fashion.

Pseudo Code Corresponding to the above routine is shown in APPENDIX II.

Process: Receive_From_Remote Entry Condition

This task executes when either a message arrives from the data link layer indicating that a new block has arrived from the Remote VC partner, or when the local Send_To_PC indicates that it is ready to receive another block.

Data Structures Assumed:

1. Circular List of Message Queues kept in the round-robin order of transmission.

2. Current Queue Ptr.

3. VC Header Block with current generation number.

Figure 10A:
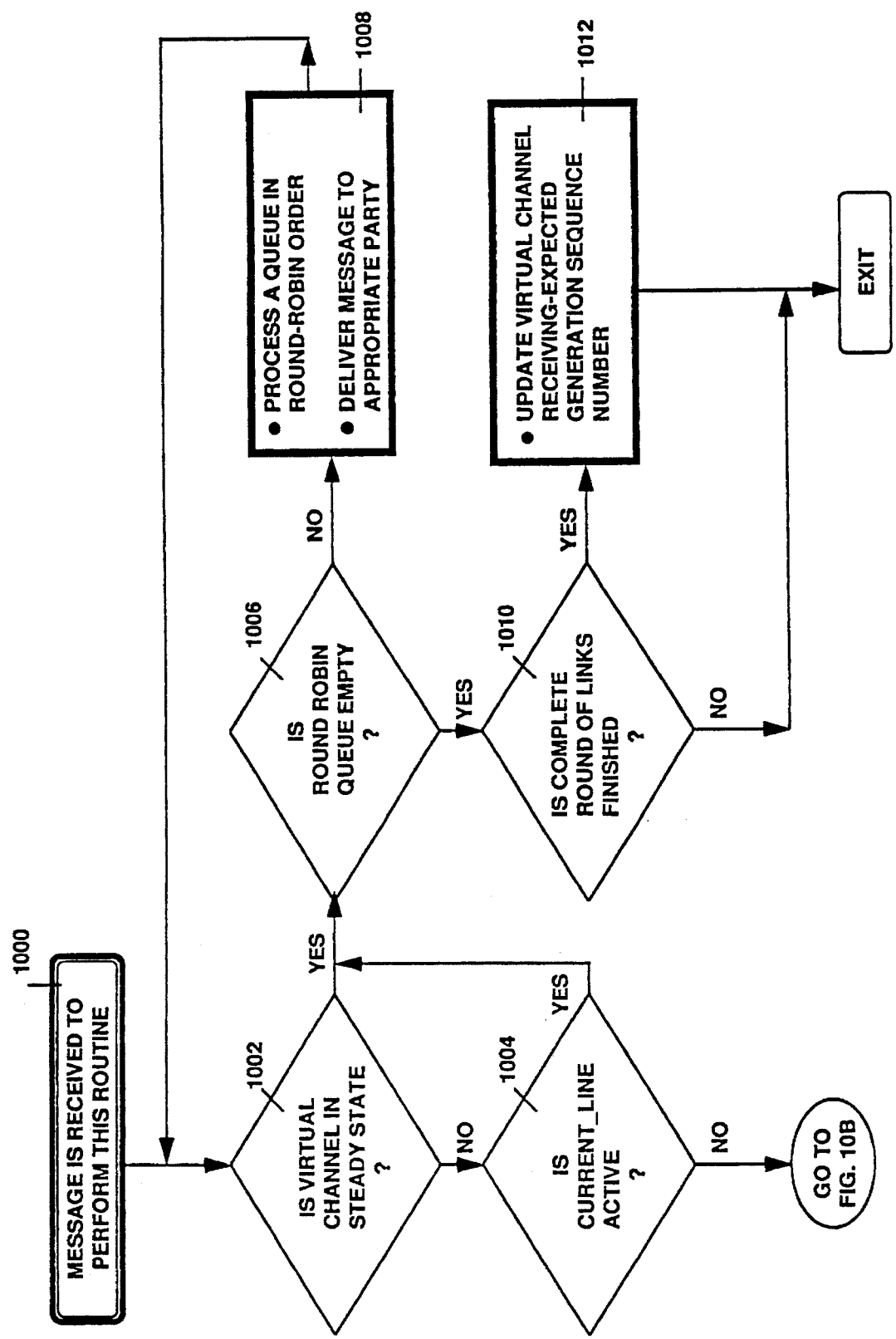
FIGS. 10A and 10B is a flow chart of a routine for receiving from a remote resource.
Figure 10B:
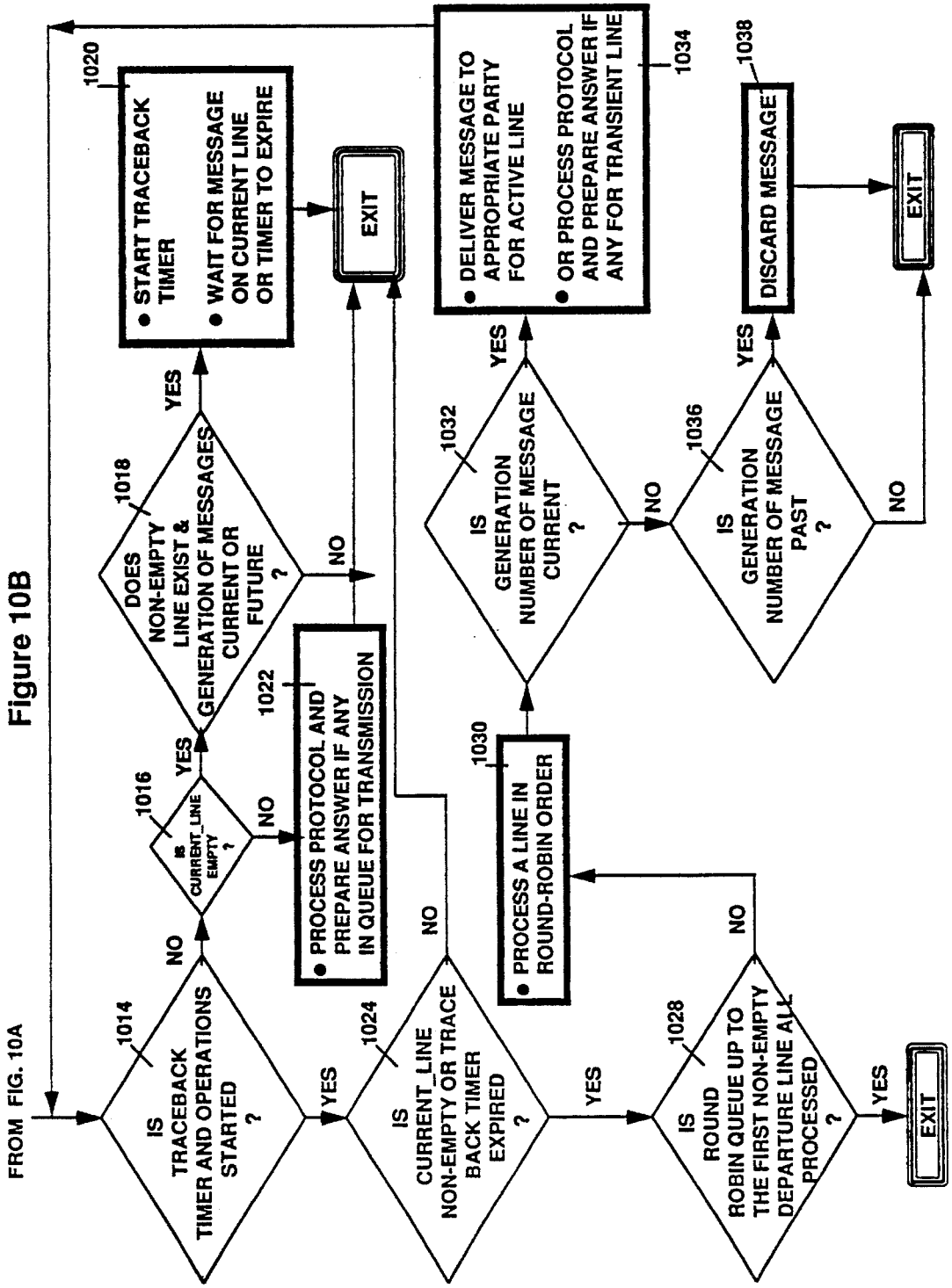

Protocol for receiving channel data from a remote source, in accordance with an aspect of this invention, can be better understood with reference to FIGS. 10A, B. Assume initially that a message has arrived from a remote source and receiving-it-to-PC has been requested (step 1000). Step 1002 determines whether the virtual channel is in steady state. Assuming that the virtual channel currently is in steady state, step 1006 interrogates the queue in a round-robin sequence to determine whether it is empty. When the queue is not empty, step 1008 processes the queue in round-robin order and sends the message to the appropriate party. This sequence of steps is repeated until a complete round of lines has been finished, determined by step 1010, and then the virtual channel header receiving-expected generation sequence number is updated (step 1012).

If the virtual channel is determined in step 1002 not to be in steady state, step 1004 then checks the current_line to determine whether it is active. When this is true, the execution goes to step 1006 as if it came from step 1002. If step 1004 determines that the current line is not active, the trace-back timer, noted previously, and which preferably is software implemented, is queried to determine whether it is triggered (step 1014). Assuming that the timer has not yet been triggered, step 1016 detects whether the current_line is empty. Only if the current_line is empty, and assuming also that a non-empty line currently exists, and the generation number of messages on this line is current or future, determined by step 1018, the timing by the trace-back timer is initiated. The program exits to step 1014 when either a message on the current_line arrives, or the trace-back timer expires (step 1020).

If step 1014 determines that the trace-back timer is started and there is a message on the current_line, or the trace-back timer expired, step 1024, the trace-back timer is aborted if it exists. If there is no message, the queue is queried on a round-robin basis, up to the line which is non-empty and from which the trace-back is departed, to determine whether it is empty (step 1028). Assuming that the queue is not empty, the line is processed in round-robin order, step 1030, and the generation number of the message is read at step 1032 to determine whether it is current. If it is current, the message is delivered to the appropriate party if data or processed if protocol (step 1034). If not, the message is discarded in step 1038 when the generation number of the message is past, or the execution simply exits (step 1036). If step 1016 determines that current_line is not empty, step 1022 is then executed. Received generation number is checked and condition of protocol is processed, which is similar to the combined steps of 1032, 1034, 1036, and 1038.

On the other hand, if the queue on a round-robin basis is not empty, the virtual channel header generation sequence number is updated (similar to step 1012). Pseudo code corresponding to the above routine is given in APPENDIX III.

6.5 Dynamic Channel Control

The computer program which is using the virtual channel controls the number of B-Channels which can participate in the virtual channel by sending commands to the CMM module 302 to indicate that a channel should be added to or deleted from the virtual channel. Channel allocation/deallocation can also occur based on actions by CMM 302 as described earlier. In the event that a channel is deallocated and then disconnected by the partner who was not the calling party (i.e., the partner who did not originate the virtual channel), it is advantageous to provide a mechanism to indicate to the original party that it should reestablish the channel when so requested. The virtual channel protocol supports this by using control messages to indicate to the communication partner that the preempted channel is available again.

Figure 8:
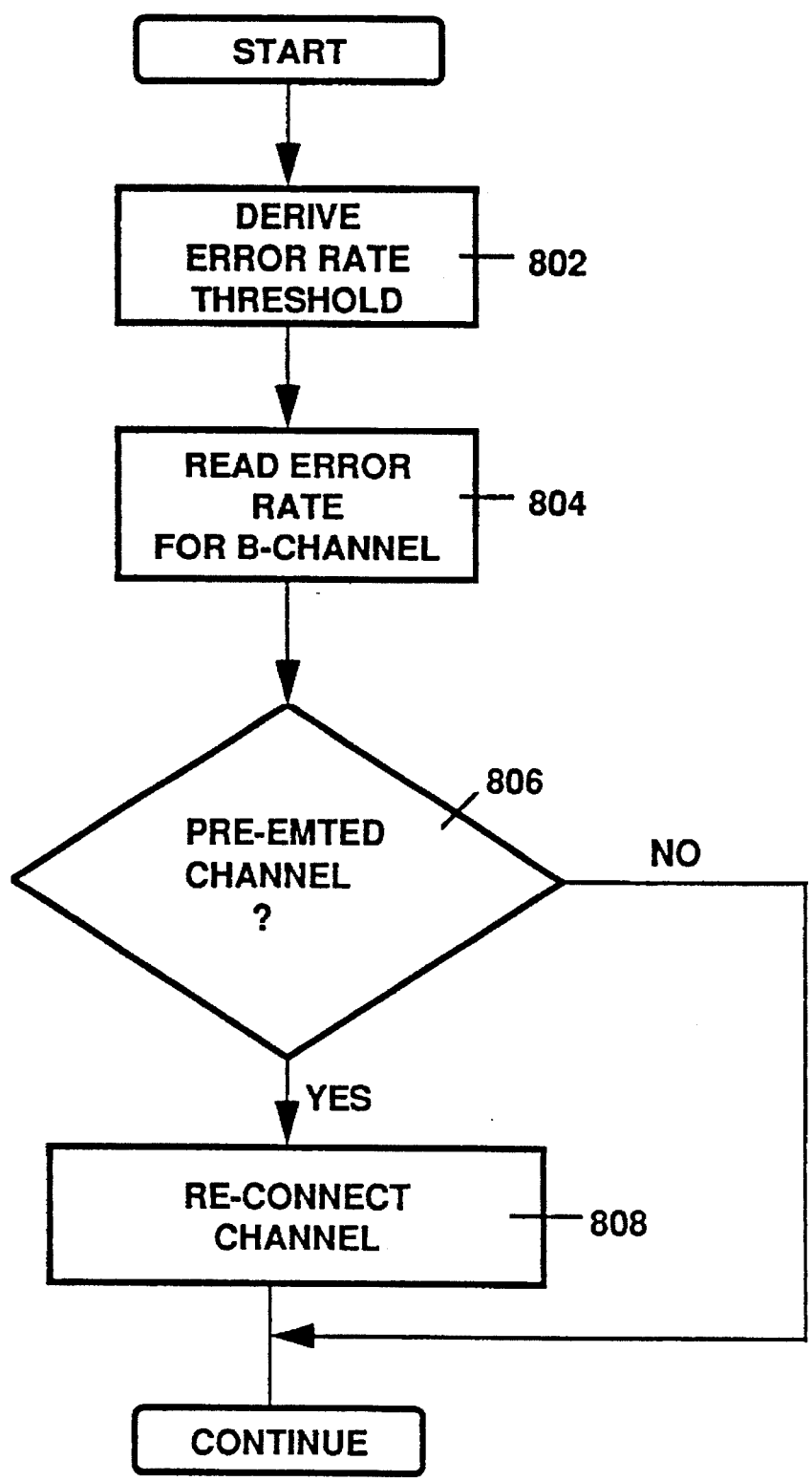
FIG. 8 is a flow chart of programming for removing B-Channels from the virtual channel in response to an excessive error rate in accordance with another aspect of the invention.

Using the routine shown in FIG. 8, the VCM 304 deletes a B-Channel if a high line error rate is detected. A predefined threshold rate of errors in a given period of time is provided to the VCM in step 802. If the data link layer for a given B-Channel 36 reports an error rate above this threshold, determined by step 804, the VCM 304 logically removes the B-Channel from the virtual channel (step 806) and requests the CMM 302 to have the channel disconnected (step 808).

The invention described herein accordingly carries out dynamic channel allocation in an ISDN line by monitoring events supplied to the line which indicate requests to use or release a B-Channel, evaluating channel usage priorities associated with users generating events monitored, and, based upon channel usage priorities, automatically setting up or tearing down B-Channels associated with the line. Processing takes place above LAPD protocol. Upon a communication coprocessor platform are provided first and second program modules, a channel management module (CMM) and a virtual channel module (VCM), to implement dynamic channel allocation. The program modules cooperate to control bandwidth between communication partners by selective allocation and deallocation of virtual B-Channels between them in response to preassigned priorities and real time events. The CMM monitors requests to connect and disconnect B-Channels by potential end users and the VCM. The CMM is capable of signalling the VCM to force deallocation of a B-Channel from a virtual channel based on a request for channel connection by a higher priority end user. The CMM signals the VCM to indicate the existence of available B-Channels when end users disconnect the channel. The VCM provides a block oriented transport service to various computer processes which can operate over one or more B-Channels. This service operates above the data link layer and manages the multiplexing of messages across one or more data link connections which operate on a B-Channel so as to ensure properly ordered delivery of message blocks. Channels are added or deleted on a dynamic basis, without interrupting the flow of data. Channel deallocation also takes place in response to high error rates in message transmission.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

APPENDIX I

| Attribute Name | Virtual B Channel Attributes Description |
|---|---|
| ERR_THRESHOLD | one out of err_threshold frames |
| ERR_ACTION_THRESH | act on contiguous err_taction_thresh |
| ERR_ACTION_PERMIT | allow deactivation of errored channel |
| MAX_BAND_WIDTH | maximum allowed bandwidth |
| HIGH_UTIL_THRESH | high effective % of bandwidth threshold |
| HIGH_BUSY_UTIL_THRESH | one high util out of high busy util |
| HIGH_ACTION_THRESH | act on contiguous high_busy_util thresh |
| HIGH_ACTION_PERMIT | allow bandwidth increment actions |
| LOW_UTIL_THRESH | minimum allowed bandwidth |
| LOW_BUSY_UTIL_THRESH | low effective % of bandwidth threshold |
| LOW_ACTION_THRESH | one low util out of low_busy_util |
| LOW_ACTION_PERMIT | act on contiguous low_busy_util_thresh |
| SET_UP_RETRY_THRESH | maximum contiguous retry before giving up |

APPENDIX I-continued

| Attribute Name | Virtual B Channel Attributes Description |
|---|---|
| NO_ACTION_THRESH | no action threshold time |

APPENDIX II

Send to Remote Routine

```
if (VC in Steady State) {
    if (Data-Block Ready to Send) {
        Add VA Header to DataBlock;
        Send Block to Curr-Line LAPD Process;
        Update Curr-Line to Next-Line in RR Fashion;
RL_CF:  if (Finish Complete Route of Line) {
            Update VC Header Gen-Seq-Number;
        }
    }Exit;
}else if (Curr-Line Active) {
    if (Data-Block Ready to Send) {
        Add VC Header to Data-Block;
        Send Block to Curr-Line LAPD Process;
        Update Curr-Line to Next-Line in RR Fashion;
        goto RL_CF;
    }
    else if (Anything to send in Transient-Line) {
        Send Full Block with VC Header;
        Send Block to Process for Synchronization;
        Update Curr-Line to Next-Line in RR Fashion;
        goto RL_CF;
    }
}else }
    Send VC Protocol Message to Create Active Channel;
    Send Block to Curr-Line LAPD Process;
    Update Curr-Line to Next-Line in RR Fashion;
    goto RL_CF;
}
```

APPENDIX III

Receive from Remote Routine

```
VC_SS:  if (VC is in Steady State) {
        if (Round-Robin Queue is Empty) {
            if (Round of Line Finished Completely) {
                Update Virtual Channel Receiving-
                expected Generation Sequence Number;
            }
            Exit;/* no data to send */
        }else {
            if (Current Line is Active)
                goto RRQ_E;
            else {
TB_O_S:         if (Trace-Back Timer and Operation is Start) {
                    if (Current-line is Non-empty OR
                    Trace-Back Timer is Expired)
                        if (Round-Robin Queue is Update to
                        The First Non-empty Departure) {
                            Exit;
                        }
                        else {
                            Process a Line in Round-Robin Order
                            if (Messag-Gen-No is update) {
                                Deliver Message to Appropriate
                                Party for Active Line;
                                OR Process Protocol and Prepare
                                Answer If any For Transient Line;
                                goto TB_O_S;
                            }
                            else {
                                if (Gen-No of Message is Past) {
                                    Discard Messages;
                                    Exit;
```

APPENDIX III-continued

Receive from Remote Routine

```
        }
        else Exit;
      }
      else Exit;
    }else {
      if (Curr-Line is Empty) {
        if (Non-empty Line && Gen-Messag>=Current) {
          Start traceback Timer;
          Wait for Message on Current Line OR
          Timer to Expire;
        }
      }else {
        Process Protocol And Prepare Answer if Any
        Queue for Transmission;
      }
    Exit;
```

I claim:

1. In a computer interface to ISDN, a method of automatically allocating/deallocating B-Channels, comprising the steps of, above a LAPD protocol of layer 2:

(a) monitoring events supplied to the ISDN which indicate requests to use or release a B-Channel;

(b) evaluating channel usage priorities associated with events monitored in step (a);

(c) based upon said channel usage priorities, automatically setting up or tearing down circuit switched B-Channels associated with said ISDN; and activating a virtual B-Channel between two compatible computer processes using a circuit switched B-Channel set up in step (c), and wherein step (c) includes the steps of logically adding or deleting circuit switched channels to or from said virtual B-Channel dynamically based on bandwidth requirements by the processes, and tearing down said virtual B-Channel based upon a condition predetermined by said computer processes.

2. The method of claim 1, wherein said events include set-up and tear down messages arriving to the ISDN over the D-Channel of said ISDN.

3. The method of claim 1, wherein said events further include generation of local messages by computer or other device locally attached to said interface.

4. The method of claim 1, wherein said ISDN is one of a group consisting of a Basic Rate Interface (BRI), a Primary Rate Interface (PRI) and a Broadband interface (BISDN).

5. The method of claim 1, wherein said events include local events generated by an analog telephone interfaced by computer in turn interfaced to the ISDN.

6. The method of claim 1, wherein said computer interface includes at least one of a shared memory component or Universal Asynchronous Receiver/Transmitter (UART$_1$ component, and wherein step (a) includes monitoring events generated by a computer process communicating with said shared memory or UART component of said computer interface.

7. The method of claim 1, wherein step (b) includes assigning priorities to said events, and step (c) includes allocating or deallocating B-Channels based upon bandwidth requirements of events having particular priorities.

8. The method of claim 7, including activating a virtual B-Channel between two compatible computer processes using a circuit switched B-Channel set up in step (c), and wherein said step of assigning is carried out during said step of activating.

9. The method of claim 1, wherein steps (a) and (b) are carried out only at customer premises equipment.

10. In a computer interface to ISDN, a method of forming a virtual B-Channel, for communication between two compatible computer processes, out of a pool of B-Channels from said ISDN, comprising the steps of:

(a) setting up a virtual B-Channel with a circuit switched B-Channel from said ISDN;

(b) logically adding or deleting circuit switched B-Channels into or from said ISDN into or from said virtual B-Channel activated in step (a);

(c) dynamically allocating or deallocating circuit switched B-Channels to or from said virtual B-Channel based upon channel bandwidth requirements by said computer processes; and (d) tearing downsaid virtual B-Channel based upon a condition predetermined by said computer processes.

11. The method of claim 10, wherein step (c) includes a step of implementing a protocol between said computer processes for using all B-Channels of said virtual B-Channel while dynamically allocating or deallocating circuit switched B-Channels to or from said virtual B-Channel based upon channel bandwidth requirements by said computer processes.

12. The method of claim 10, wherein said method comprises a full duplex mode of communication, and the step of adding or deleting multiple circuit switched B-Channels into or from said ISDN into or from said virtual B-Channel is carried out as a parallel process.

13. The method of claim 10, including the additional steps of:

(a) monitoring on said ISDN events that are local or remote with respect to one of said computer processes; and (b) in response to step (a), evaluating channel bandwidth requirements of said remote or local events;

wherein step (b) includes the step of automatically setting up or tearing down a circuit switched B-Channel based upon said channel bandwidth requirements of said processes.

14. The method of claim 11, wherein the step of implementing includes exchanging between said processes information sufficient to indicate that an incoming call set up request is directed to said virtual B-Channel, and allocating a circuit switched B-Channel thereto.

15. The method of claim 10, wherein step (b) is initiated by either one of said compatible computer processes.

16. The method of claim 10, wherein steps (b), (c) and (d) are initiated by the computer processes or user applications.

17. Apparatus for interfacing a computer to ISDN, comprising:

a processor;

a virtual B-channel between said computer and said ISDN, and program means executable by said processor and operating above a LAPD protocol of Layer 2 for monitoring events supplied to the ISDN which indicate requests to use or release said virtual B-channel, evaluating channel usage priorities associated with users generating events, and based upon channel bandwidth requirements by said events and said channel usage priorities, logically adding or deleting circuit switched channels to or from said virtual B-channel.

18. The apparatus of claim 7, wherein said program means includes means for activating a virtual B-Channel between two compatible computer processes using a B-Channel that has been set up by said program means, and based on said bandwidth requirements and usage priorities logically adding or deleting circuit switched B channels to or from said virtual B-Channel, and tearing down said virtual B-Channel based upon a condition predetermined by said computer processes.

19. The apparatus of claim 17, wherein said program means includes means for assigning priorities to said events and allocating or deallocating circuit switched B-Channels based upon bandwidth requirements of events having particular assigned priorities.

20. The apparatus of claim 17, including at least one of a shared memory component and Universal Asynchronous Receiver/Transmitter (UART) component, and wherein said program means includes means for monitoring events generated by a computer process communicating with said shared memory or UART component.

21. The apparatus of claim 17, wherein said program means comprises software loaded into and executed by said computer.

22. The apparatus of claim 20, wherein said program means is implemented in the form of firmware co-resident on a card with said shared memory and UART component.

23. Apparatus for interfacing a computer to ISDN, comprising:

a processor; and program means executable by said processor and operating above a LAPD protocol of Layer 2 for setting up between two compatible computer processes a virtual B-Channel with a circuit switched B-Channel from said ISDN, logically adding or deleting a circuit switched B-Channel into or from said ISDN into an activated virtual B-Channel, dynamically allocating or deallocating circuit switched B-Channels to or from said virtual B-Channel based upon bandwidth requirements by said computer processes, and tearing down said virtual B-Channel based upon a condition predetermined by said computer processes.

24. The apparatus of claim 23, wherein said program means includes means for implementing a protocol between said computer processes for using all B-Channels of said virtual B-Channel while dynamically allocating or deallocating circuit switched B-Channels to or from said virtual B-Channel based upon channel bandwidth requirements by said computer processes.

25. The apparatus of claim 23, wherein said program means includes means for monitoring on said ISDN events that are local or remote with respect to one of said computer processes, and, in response, evaluating channel requirements of said remote or local events including automatically setting up or tearing down a B-Channel based upon said channel requirements.

26. The apparatus of claim 23, including at least one of a shared memory component and universal asynchronous receiver/transmitter (UART) component, and wherein said program means includes means for monitoring events generated by a computer process communicating with said shared memory or UART component.

27. The apparatus of claim 23, wherein said program means comprises software loaded into and executed by said computer.

28. The apparatus of claim 26, wherein said program means is implemented at least partially in the form of firmware co-resident on a card with said shared memory and UART components.

29. Apparatus for interfacing a personal computer to ISDN, comprising:

a processor; and program means executable by said processor and operating above LAPD protocol of Layer for setting up a virtual B-Channel with a B-Channel from said ISDN, logically adding or deleting a B-Channel into or from said ISDN into said virtual B-Channel, dynamically allocating or deallocating B-Channels to or from said virtual B-Channel based upon usage by said computer processes, and tearing down said virtual B-Channel based upon a condition predetermined by said computer processes;

said program means comprising (a) a channel management module (CMM) for monitoring requests to connect or disconnect B-Channels by users; and (b) a virtual channel module (VCM) responsive to information from said CMM and providing a block oriented transport service to computer processes capable of operating over one or more B-Channels for allocating or deallocating B-Channels to or from a virtual B-Channel without interrupting flow of data in said virtual B-Channel.

30. The apparatus of claim 29, wherein said CMM further supplies to said VCM information on availability of a B-Channel when a user disconnects it.

31. The apparatus of claim 29, wherein said CMM further supplies to said VCM information instructing deallocation of a B-Channel from said virtual B-Channel upon a request for channel connection by a user having a priority greater than the priority of a current user.

32. The apparatus of claim 29, wherein said VCM includes means for detecting in a line a message transmission containing an error rate greater than a predetermined acceptable error rate, and in response, requesting deallocation of said line.

33. The apparatus of claim 29, wherein said program means further includes trace-back timer means initiated at the probable logical end of a receiving for recovery of time inverted propagation of events on the ISDN.

34. The apparatus of claim 29, wherein said program means further includes means for operating a channel selectively in deactivated, activated and transient states.

35. The apparatus of claim 29, wherein said program means further includes means for synchronization of channels in steady state and during parallel insertion and deletion of component channels into or from a virtual channel.

36. The apparatus of claim 35, wherein said synchronization means includes means for performing simultaneous regulation of data flow between and within B-Channels.

37. The apparatus of claim 36, wherein said data regulation within B-Channels comprises regulation by generation number.

38. The apparatus of claim 36, wherein said data regulation between B-Channels comprises regulation by a round-robin protocol.

39. The apparatus of claim 38, wherein said round-robin protocol comprises regulation by a trace-back timer and data fragmentation.

40. The apparatus of claim 29, wherein said program means comprises system software loaded into and executed by said personal computer.

41. The apparatus of claim 29, wherein said program means comprises firmware resident on a card mounted in said personal computer.

42. The method of claim 29, wherein B-channels forming said virtual B-channel comprise circuit-switched B-channels.

* * * * *